US010482578B2

(12) United States Patent
Lu

(10) Patent No.: US 10,482,578 B2
(45) Date of Patent: Nov. 19, 2019

(54) METHOD AND SYSTEM FOR CONTROLLING DISPLAY DIRECTION OF CONTENT

(71) Applicant: Alibaba Group Holding Limited, George Town, Grand Cayman (KY)

(72) Inventor: Yaran Lu, Hangzhou (CN)

(73) Assignee: Alibaba Group Holding Limited, George Town (KY)

(*) Notice: Subject to any disclaimer, the term of this patent is extended or adjusted under 35 U.S.C. 154(b) by 6 days.

(21) Appl. No.: 14/928,116

(22) Filed: Oct. 30, 2015

(65) Prior Publication Data

US 2016/0132130 A1 May 12, 2016

(30) Foreign Application Priority Data

Nov. 6, 2014 (CN) .......................... 2014 1 0638523

(51) Int. Cl.
*G06T 3/60* (2006.01)
(52) U.S. Cl.
CPC ..................................... *G06T 3/60* (2013.01)
(58) Field of Classification Search
None
See application file for complete search history.

(56) References Cited

U.S. PATENT DOCUMENTS

| 6,173,400 | B1 | 1/2001 | Perlman et al. |
| 6,489,981 | B1 | 12/2002 | Jones |
| 6,727,929 | B1 | 4/2004 | Bates |
| 7,299,411 | B2 | 11/2007 | Blair |
| 7,447,995 | B2 | 11/2008 | Luciani, Jr. |
| 7,562,070 | B2 | 7/2009 | Tchaitchian |

(Continued)

FOREIGN PATENT DOCUMENTS

| EP | 2189929 | 5/2010 |
| EP | 2573669 A2 | 3/2013 |

(Continued)

OTHER PUBLICATIONS

Hinckley, Ken, and Hyunyoung Song. "Sensor synaesthesia: touch in motion, and motion in touch." Proceedings of the SIGCHI Conference on Human Factors in Computing Systems. ACM, 2011.*

(Continued)

*Primary Examiner* — Yi Wang
(74) *Attorney, Agent, or Firm* — Shun Yao; Park, Vaughan, Fleming & Dowler LLP

(57) ABSTRACT

One embodiment provides a system that facilitates control of the display direction of content on a device. During operation, the system receives, by a client computing device, a first command to lock a state of a display for the device. The system sets a current display state to a locked state. In response to receiving a second command to terminate the first command, the system sets the current display state to a state that is the display state prior to receiving the first command. The system detects a change in a position of the device. In response to determining that the current display state is an unlocked state, the system changes a display direction for content displayed on the device. In response to determining that the current display state is the locked state, the system refrains from changing the display direction for content displayed on the device.

22 Claims, 8 Drawing Sheets

(56) References Cited

U.S. PATENT DOCUMENTS

| | | |
|---|---|---|
| 7,603,369 B2 | 10/2009 | Koganei |
| 7,711,113 B2 | 5/2010 | Takahashi |
| 7,769,773 B1 | 8/2010 | Doubek |
| 7,827,481 B1 | 11/2010 | Greenfield |
| 7,904,835 B1 | 3/2011 | Dhawan |
| 8,117,450 B2 | 2/2012 | Krawetz |
| 8,619,983 B2 | 12/2013 | Tao |
| 8,621,203 B2 | 12/2013 | Ekberg |
| 9,317,484 B1 | 4/2016 | Ho |
| 2002/0016721 A1 | 2/2002 | Mason |
| 2003/0095150 A1 | 5/2003 | Trevino |
| 2004/0133855 A1 | 7/2004 | Blair |
| 2005/0035976 A1 | 2/2005 | Ecob |
| 2005/0233287 A1 | 10/2005 | Bulatov |
| 2006/0143571 A1 | 6/2006 | Chan |
| 2006/0156012 A1 | 7/2006 | Beeson |
| 2006/0210078 A1 | 9/2006 | Sakamura |
| 2006/0230352 A1 | 10/2006 | Nielsen |
| 2007/0192678 A1 | 8/2007 | Tang |
| 2007/0192689 A1 | 8/2007 | Johnson |
| 2007/0198910 A1 | 8/2007 | Jensen |
| 2007/0288501 A1 | 12/2007 | Estrada |
| 2007/0294644 A1 | 12/2007 | Yost |
| 2008/0168345 A1 | 7/2008 | Becker |
| 2008/0186162 A1 | 8/2008 | Rajan |
| 2008/0207169 A1 | 8/2008 | Park |
| 2008/0212771 A1 | 9/2008 | Hauser |
| 2008/0215976 A1 | 9/2008 | Bierner |
| 2009/0112968 A1 | 4/2009 | Matsune |
| 2009/0217145 A1 | 8/2009 | Watson |
| 2010/0125541 A1 | 5/2010 | Wendel |
| 2010/0184378 A1 | 7/2010 | Wakefield |
| 2010/0216429 A1 | 8/2010 | Mahajan |
| 2010/0229224 A1 | 9/2010 | Etchegoyen |
| 2010/0266125 A1 | 10/2010 | Tanaka |
| 2010/0325441 A1 | 12/2010 | Laurie |
| 2011/0185402 A1 | 7/2011 | Wang |
| 2011/0314091 A1 | 12/2011 | Podjarny |
| 2012/0102558 A1 | 4/2012 | Muraki |
| 2012/0133678 A1 | 5/2012 | Kim |
| 2012/0144457 A1 | 6/2012 | Counterman |
| 2012/0206350 A1 | 8/2012 | Figaro |
| 2012/0268244 A1 | 10/2012 | Ljung |
| 2013/0024763 A1 | 1/2013 | Nemati |
| 2013/0113731 A1* | 5/2013 | Yoo ............... G06F 3/0488 345/173 |
| 2013/0141464 A1 | 6/2013 | Hunt et al. |
| 2013/0159839 A1 | 6/2013 | Joffray |
| 2013/0174021 A1 | 7/2013 | Buchwald |
| 2013/0174120 A1 | 7/2013 | Kalaidjian |
| 2013/0219268 A1 | 8/2013 | Straten |
| 2013/0265250 A1 | 10/2013 | Ishikawa |
| 2013/0342473 A1* | 12/2013 | Sultenfuss ............ G06F 3/044 345/173 |
| 2014/0009499 A1 | 1/2014 | Gaerdenfors |
| 2014/0066015 A1 | 3/2014 | Aissi |
| 2014/0092018 A1 | 4/2014 | Geithner |
| 2014/0095579 A1 | 4/2014 | Shah |
| 2014/0136956 A1 | 5/2014 | Wong |
| 2014/0149844 A1 | 5/2014 | Podjarny |
| 2014/0214779 A1 | 7/2014 | Francis |
| 2014/0289612 A1 | 9/2014 | Mi |
| 2015/0039883 A1 | 2/2015 | Yoon |
| 2015/0116232 A1* | 4/2015 | Hayakawa ........... G06F 3/0412 345/173 |
| 2015/0135108 A1* | 5/2015 | Pope .................. G06K 9/00006 715/767 |
| 2015/0193912 A1* | 7/2015 | Yuasa ..................... G09G 5/00 345/659 |
| 2015/0200941 A1 | 7/2015 | Muppidi |
| 2016/0072819 A1 | 3/2016 | Chen |
| 2016/0105410 A1 | 4/2016 | Zhou |
| 2016/0139788 A1* | 5/2016 | Nishikori ............... G11B 27/34 715/716 |
| 2016/0306524 A1* | 10/2016 | Park ..................... G06F 1/1626 |

FOREIGN PATENT DOCUMENTS

| | | | |
|---|---|---|---|
| JP | 2009260688 | 11/2009 | |
| JP | 2013069297 | 4/2013 | |
| WO | 2012114592 | 8/2012 | |
| WO | 20130173838 A2 | 11/2013 | |
| WO | 2013185718 | 12/2013 | |
| WO | WO-2013185718 A2 * | 12/2013 | ............. H04M 1/67 |
| WO | 2014030455 | 2/2014 | |

OTHER PUBLICATIONS

Hinckley, Ken, and Hyunyoung Song. "Sensor Synaesthesia: Touch in Motion, and Motion in Touch." Proceedings of the SIGCHI Conference on Human Factors in Computing Systems. AMC, 2011.
Anonymous: "Affenformular (Standardverfahren)—PHP.de Wiki", Jul. 8, 2010, Retrieved from the Internet: URL:hhtp://www.php.de/wiki-php/index.php/Affenformular_(Standardverfahren) [retrieved on Jan. 28, 2015], *the whole document*.

* cited by examiner

METHOD AND SYSTEM FOR CONTROLLING DISPLAY DIRECTION OF CONTENT

RELATED APPLICATION

Under 35 U.S.C. 119, this application claims the benefit and right of priority of Chinese Patent Application No. 201410638523.9, filed 6 Nov. 2014.

BACKGROUND

Field

This disclosure is generally related to controlling the display of content. More specifically, this disclosure is related to a system and method for controlling the direction for the display of content.

Related Art

The progress of technology brings an increasing amount of mobile usage into various aspects of everyday life. People use mobile devices such as cell phones and tablets everywhere, e.g., riding or waiting for public transportation, standing in line, sitting down in a park, drinking or eating at home or at a restaurant, and lying down in bed. Devices are often held in a vertical position, but sometimes a user moves the phone to a horizontal position (e.g., to watch a movie or view a picture that is in landscape format). Traditional phone software may use gravity sensors to determine whether the position of the phone has changed, and change the display direction for the content accordingly. However, a user may wish to "lock" the corresponding rotation of the content when the user rotates the device. For example, when a user is lying down, the user may wish to keep the display direction of the content locked regardless of the position or rotation of the device.

Existing methods that allow a user to lock or unlock content rotation that corresponds to device rotation may involve navigating to a settings screen and selecting an option or icon to lock or unlock rotation. Subsequent changes to the device position may also require additional navigation, selection, and other operations by the user. However, these methods are cumbersome for the user and decrease the efficiency of the device. Other methods may present a floating lock icon on the screen only after the device has been rotated, e.g., when the device position has changed. However, this method does not allow the user to lock the rotation until after a default content rotation occurs in response to a device rotation. Furthermore, these ineffective methods may result in time-consuming processes for the device.

SUMMARY

One embodiment provides a system that facilitates control of the display direction of content on a device. During operation, the system receives, by a client computing device, a first command to lock a state of a display for the device. The system sets a current display state to a locked state. In response to receiving a second command to terminate the first command, the system sets the current display state to a state that is the display state prior to receiving the first command. The system detects a change in a position of the device. In response to determining that the current display state is an unlocked state, the system changes a display direction for content displayed on the device. In response to determining that the current display state is the locked state, the system refrains from changing the display direction for content displayed on the device.

In some embodiments, the first command comprises an object initiating contact with a touch screen or a physical key on the device.

In some embodiments, the object initiating contact with the touch screen or the physical key on the device is one or more of: one or more fingers of a user of the device; and any object comprised of a material recognizable by the touch screen or the physical key.

In some embodiments, the first command comprises the object initiating contact with the touch screen or the physical key by maintaining contact with the touch screen or the physical key, and the second command comprises the object terminating contact with the touch screen or the physical key.

In some embodiments, the first command comprises the object initiating contact with the touch screen or the physical key by tapping an area on the touch screen or the physical key.

In some embodiments, in response to receiving the first command, the system starts a timer for a predetermined duration of time. In response to an expiration of the timer, the system receives the second command to terminate the first command.

In some embodiments, the area on the touch screen comprises a locking indicator or an icon that indicates a locking function.

In some embodiments, in response to refraining from changing the display direction upon detecting a change in the position of the device, the system receives the second command to terminate the first command.

In some embodiments, the device has a length not equal to a width, and wherein a vertical position of the device corresponds to a shorter side placed parallel to the ground and a horizontal position of the device corresponds to a longer side placed parallel to the ground.

In some embodiments, detecting a change in the position of the device further comprises: detecting a change from the horizontal position to the vertical position or from the vertical position to the horizontal position.

In some embodiments, the device has a length not equal to a width, wherein a vertical display direction for the content corresponds to content displayed from a top to a bottom of the device along a longer side with a shorter side placed parallel to the ground, and wherein a horizontal display direction for the content corresponds to content displayed from the top to the bottom of the device along the shorter side with the longer side placed parallel to the ground.

In some embodiments, changing a display direction for content displayed on the device further comprises: changing the display direction from the horizontal display direction to the vertical display direction or from the vertical display direction to the horizontal display direction.

BRIEF DESCRIPTION OF THE FIGURES

In the figures, like reference numerals refer to the same figure elements.

DETAILED DESCRIPTION

Figure 1:
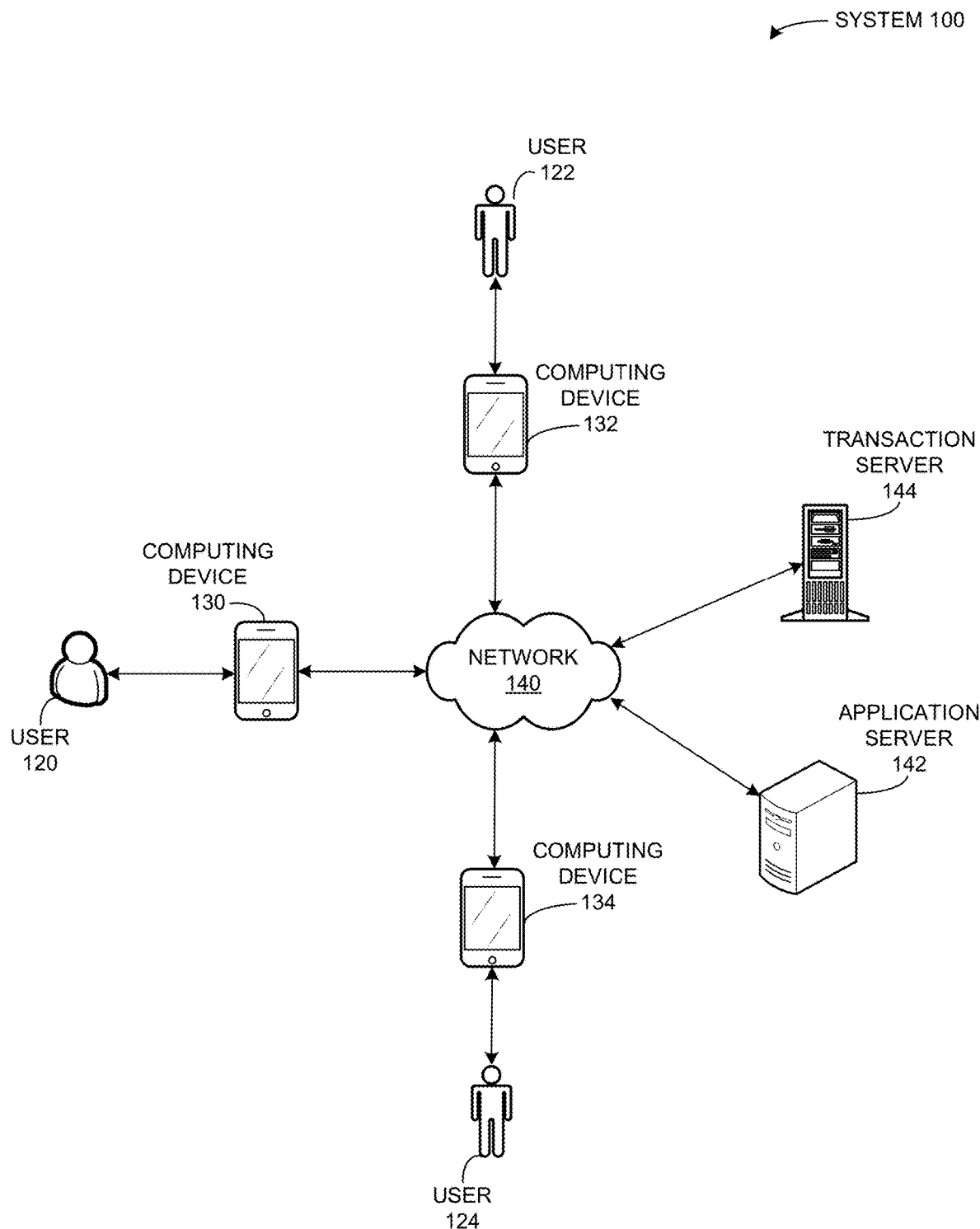
FIG. 1 illustrates an exemplary computing system that facilitates control of the display direction of content on a device, in accordance with an embodiment of the present application.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of improving the efficiency of controlling the display direction of content on a device by providing a system which allows a device user an efficient way to lock the displayed content into the desired vertical or horizontal position. Existing methods of controlling display direction may require a user to navigate to a settings page, scroll to the correct setting, and select to lock or unlock by tapping or sliding on an icon. Other methods may present a user with an option to lock the screen only after a rotation of both the device and the content. The present system solves these inefficiencies by allowing a user to simply press and hold a specific part of the screen while rotating the phone to lock the screen. The present system also allows the user to tap a specific portion or icon on the screen, which locks the rotation for a predetermined amount of time. The system may use a default duration of time to lock the rotation upon receiving a tap "command," or the user can set the duration of time for locking the rotation in the device settings. Thus, the system allows a user to control the display direction relative to the device position in a flexible and efficient manner without multiple manual operations by the user.

The following terms describe potential configurations for the position of a device and the display direction of content on the device (as depicted below in FIG. 3):

Device position: Given a device whose length and width are not equal, with a "longer side" and a "shorter side," the position of the device is described as a "vertical position" when the shorter side is placed parallel to the ground. The position of the device is described as a "horizontal position" when the longer side is placed parallel to the ground. An example of a device with a device position in the vertical position is shown in Configuration A of FIG. 3, while an example of a device with a device position in the horizontal position is shown in Configurations B and C of FIG. 3.

Display direction: Given a device whose length and width are not equal, with a "longer side" and a "shorter side," and a display screen which has similar dimensions as the device, the display direction for the content is described as a "vertical display direction" when the content is displayed from the top to the bottom of the device/screen along the longer side with the shorter side parallel to the ground. The display direction for the content is described as a "horizontal display direction" when the content is displayed from the top to the bottom of the device/screen along the shorter side with the longer side placed parallel to the ground. An example of a device/screen with a display direction in the vertical position is shown in Configurations A and C of FIG. 3, while an example of a device/screen with a display direction in the horizontal position is shown in Configuration B of FIG. 3. The display direction indicates a relationship between a coordinate system for the displayed content and the display screen of the device.

Figure 3:
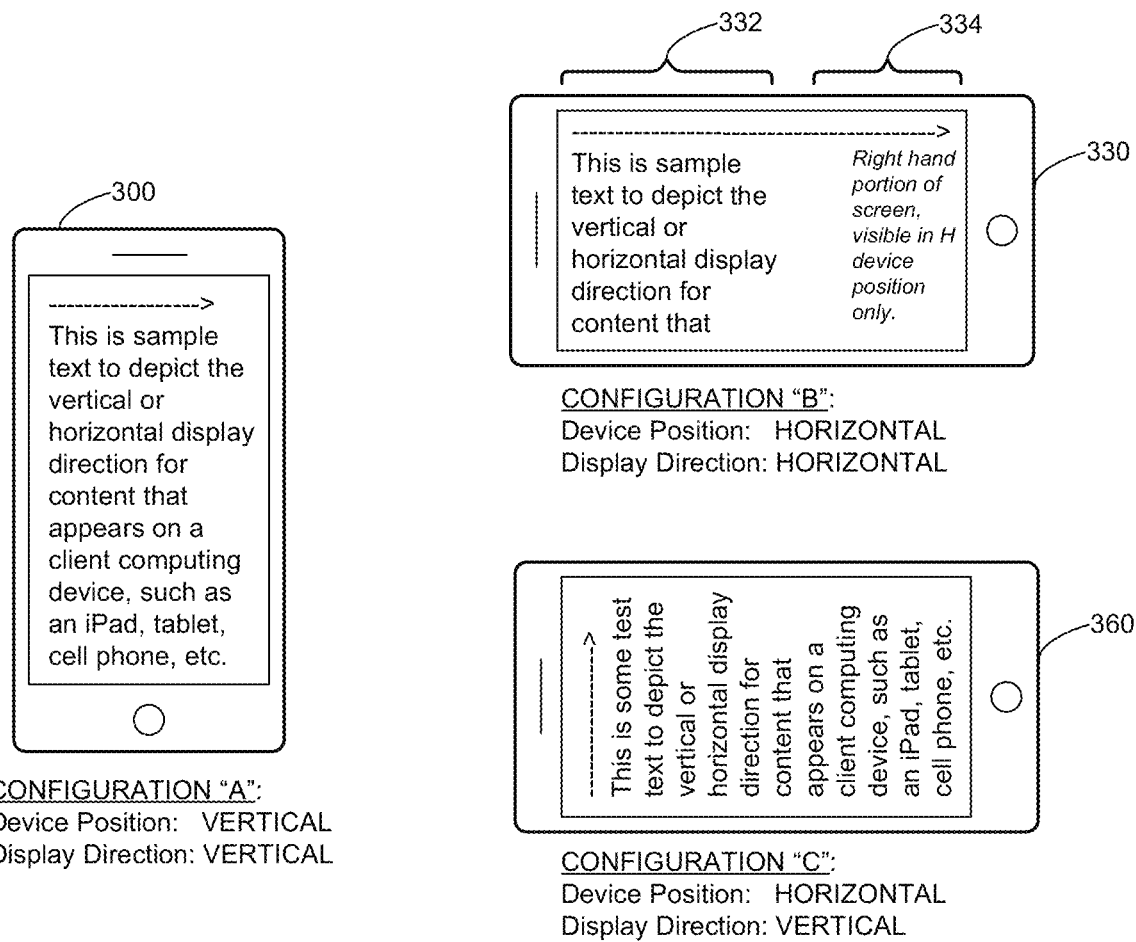
FIG. 3 illustrates exemplary configurations of device position and display direction for content on a client computing device, in accordance with an embodiment of the present application.

Display state: The state for a display of the device can be either a "locked state" or an "unlocked" state. If the device is in a locked state, the display direction of the content will not change when the device position changes. If the device is in an unlocked state (e.g., the content is allowed to be "rotatable" corresponding to the rotation of the device), the display direction of the content will change when the device position changes. For example, as shown in FIG. 3, if a device starts at Configuration A in a locked state, a change in device position from vertical to horizontal will result in Configuration C, while if the device starts at Configuration A in an unlocked state, a change in device position from vertical to horizontal will result in Configuration B. The system allows a user to control the display direction relative to the device position by controlling the display state, which determines whether the display direction changes in response to a change in the device position.

FIG. 1 illustrates an exemplary computing system 100 that facilitates control of the display direction of content on a device, in accordance with an embodiment of the present application. In this example, system 100 can include computing devices 130, 132, and 134, which are associated with users 120, 122, and 124, respectively. Computing devices 130-134 can include, for example, a tablet, a mobile phone, an electronic reader, or any other mobile computing device. Computing devices 130-134 can communicate with an application server 142 and a transaction server 144 (e.g., an electronic commerce merchant's datacenter) via a network 140.

During operation, user 120 interacts with corresponding computing device 130. For example, user 120 may browse a retailer's website via a web browser running on mobile device 130 and send a request over network 140 to server 144 to purchase an item on the retailer's website. In another example, user 120 may stream a movie via an application running on mobile device 130 by receiving data over network 140 from server 142. User 120 may also interact with device 130 in a manner that does not involve network 140. User 120 may begin with device 130 in a vertical device position, the content displayed in a vertical display direction (Configuration A), and an unlocked display state. During user 120's interaction with device 130, user 120 may wish to rotate device 130 to a horizontal device position with a corresponding change in the display direction of the content so that user 120 can, e.g., view the content on the right side of the web page without scrolling over or view the movie in a landscape format (Configuration B).

Figure 4:
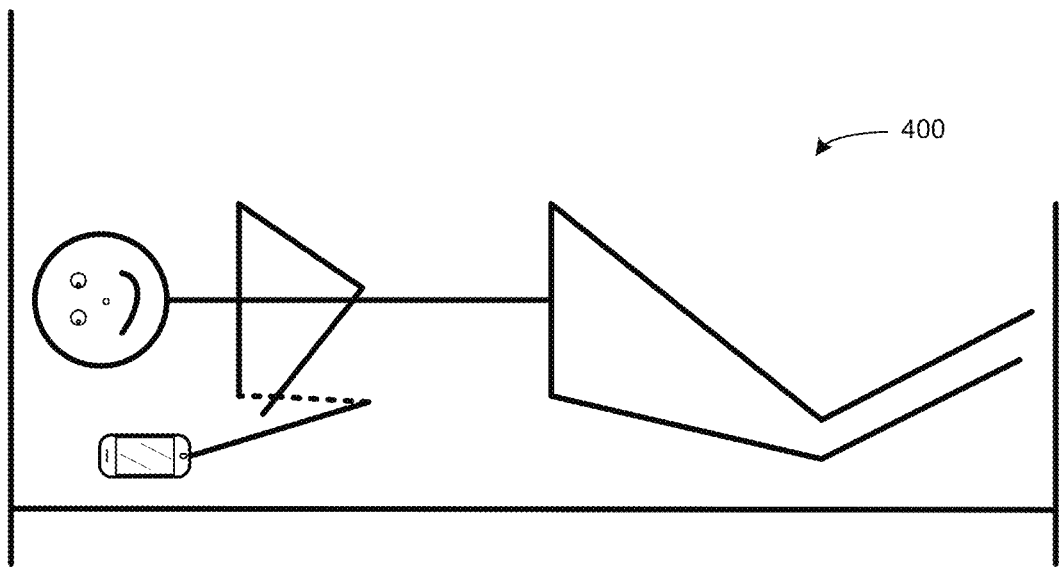
FIG. 4 illustrates an exemplary user position in relation to a client computing device, in accordance with an embodiment of the present application.

Alternatively, user 120 may wish to lock the corresponding content rotation, e.g., if user 120 is lying down on his side and viewing device 130 in bed or on a couch (as shown in FIG. 4). The present invention provides several embodiments for facilitating this functionality. In one embodiment (described below in relation to FIG. 5), user 120 may use his finger to press and hold a portion of the screen that indicates a locking function, resulting in Configuration C when the device position is changed from vertical to horizontal (e.g., when user 120 lies down on his side with device 130). When user 120 releases his finger, the display state returns to the state it was in before the user pressed and held the screen (e.g., the unlocked state with the content in a horizontal display direction, as in Configuration B).

In another embodiment (described below in relation to FIG. 6), user 120 may use his finger to tap a portion of the screen that indicates a locking function, again resulting in Configuration C when the device position is changed from vertical to horizontal. A timer may also be started upon the single tap. The timer can have a predetermined expiration time which can be set by the system of device 130 or manually configured by user 120 on device 130. When the timer expires, the display state returns to the state it was in before the user pressed and held the screen (e.g., the unlocked state with the content in a horizontal display direction, as in Configuration B).

Thus, system 100 depicts a system that provides efficient user control of the display direction of content on a mobile device in response to a change in the position of the device.

General Method for Controlling Display Direction

Figure 2:
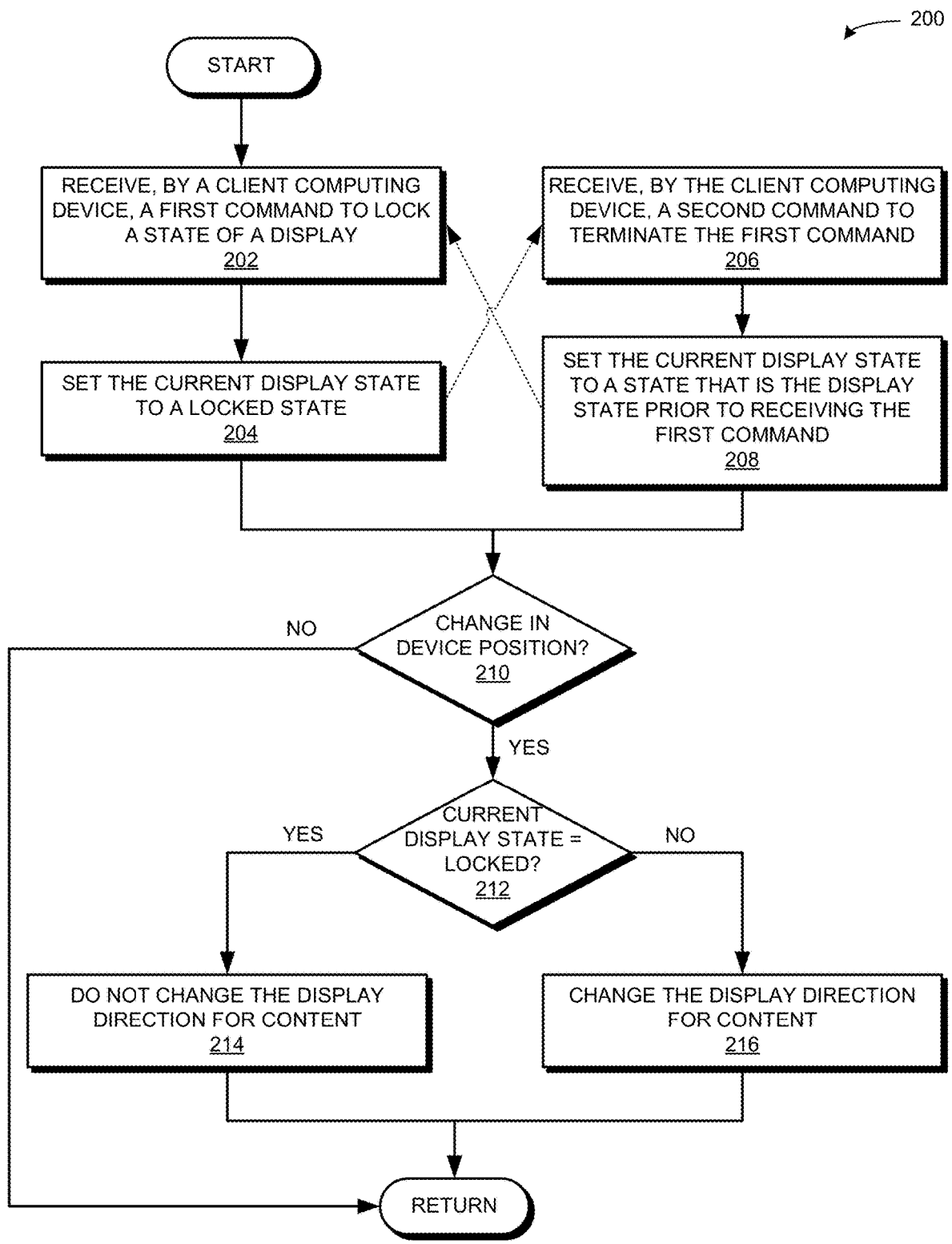
FIG. 2 presents a flowchart illustrating a method by a client computing device for controlling the display direction of content on the device, in accordance with an embodiment of the present application.

FIG. 2 presents a flowchart 200 illustrating a method by a client computing device for controlling the display direction of content on the device, in accordance with an embodiment of the present application. During operation, the system receives, by a client computing device, a first command to lock a state of a display for the device (operation 202). The display state can be a locked state or an unlocked state. The system sets the current display state to a locked state (operation 204). Next, the system can perform either of operations 206 or 210. The system can receive a second command to terminate the first command (operation 206) and set the current display state to the state that is/was the display state prior to receiving the first command (operation 208). Next, the system can perform either of operations 202 or 210. This cyclical or loop-like nature of these operations allows a user to change the display state from an unlocked state to a locked state, and from a locked state to an unlocked state after the user performs an action corresponding to the first or second command. Examples of user actions are described below in relation to FIGS. 5A, 5B, and 6.

Subsequent to operations 204 or 208, the system determines whether it detects a change in the position of the device (decision 210). For example, the system can detect a change from a horizontal device position to a vertical device position or from a vertical device position to a horizontal device position. The system then determines whether the current display state is a locked state (decision 212). If the current display state is a locked state, the system does not change the display direction for the content (operation 214). In other words, the system refrains from changing the display direction. If the current display state is an unlocked state, the system changes the display direction for the content (operation 216). For example, the system can change the display direction for content from a vertical display direction to a horizontal display direction or from a horizontal display direction to a vertical display direction.

Exemplary Configurations of Device Position and Display Direction

FIG. 3 illustrates exemplary configurations of device position and display direction for content on a client computing device, in accordance with an embodiment of the present application. Device 300 corresponds to Configuration A with a vertical device position and a vertical display direction for content. Device 330 corresponds to Configuration B with a horizontal device position and a horizontal display direction for content. An area 332 indicates the portion of the screen that is visible from the content of device 300. Area 332 may be cut off on the bottom. An area 334 indicates a right hand portion of the screen which may be visible only when the device is in the horizontal device position. Device 360 corresponds to Configuration C with a horizontal device position and a horizontal display direction. Configuration B is the result of an unlocked display state upon a change in device position from vertical to horizontal, while Configuration C is the result of a locked display state upon a similar change in device position (from vertical to horizontal).

FIG. 4 illustrates an exemplary user position 400 in relation to a client computing device, in accordance with an embodiment of the present application. User position 400 is a position in which the user is lying down on her side viewing her phone, with the phone in a locked display state and the device as shown in Configuration C of FIG. 3 (e.g., a horizontal device position and a vertical display direction).

Exemplary Methods for Controlling Display Direction

Figure 5A:
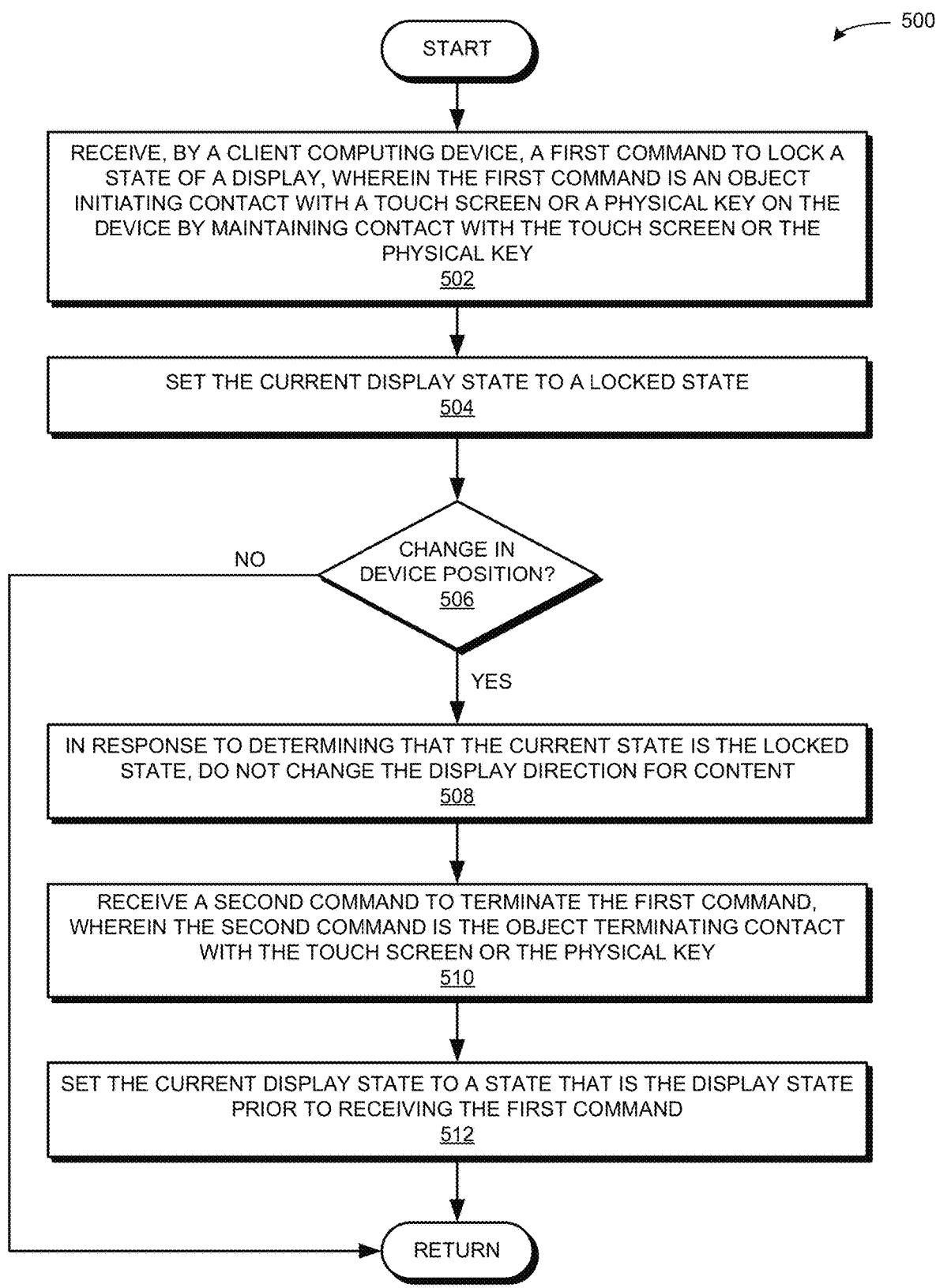
FIG. 5A presents a flowchart illustrating a method by a client computing device for controlling the display direction of content on the device, where an object maintains contact with the touch screen or a physical key, in accordance with an embodiment of the present application.

FIG. 5A presents a flowchart 500 illustrating a method by a client computing device for controlling the display direction of content on the device, where an object maintains contact with the touch screen or a physical key, in accordance with an embodiment of the present application. Flowchart 500 has a similar structure as flowchart 200 of FIG. 2, but is slightly modified to demonstrate the exemplary method for controlling the display direction. During operation, the system receives, by a client computing device, a first command to lock a state of a display for the device, where the first command is an object initiating contact with a touch screen or a physical key on the device by maintaining contact with the touch screen or the physical key (operation 502). For example, the object can be one or more fingers of the user, or a glove with a special coating that can be read by the touch screen, or any object made of a material recognizable by the touch screen or the physical key. The first command can be the user's finger pressing and holding a particular part of the touch screen or the physical key. The system sets the current display state to a locked state (operation 504). The system determines whether it detects a change in the position of the device (decision 506). For example, the system can detect a change from a horizontal to a vertical device position or from a vertical to a horizontal device position. If the system does not detect a change in device position, the operation returns. If the system does detect a change in device position, in response to determining that the current display state is the locked state, the system does not change the display direction for the content (operation 508). In other words, the system refrains from changing the display direction. Note that if the current display state is an unlocked state, the system changes the display direction for the content (as shown by operation 216), e.g., from a vertical to a horizontal display direction, or from a horizontal to a vertical display direction. Subsequently, the system can receive a second command to terminate the first command, where the second command is the object terminating contact with the touch screen or the physical key (operation 510). The system sets the current display state to the state that is the display state prior to receiving the first command (operation 512).

Figure 5B:
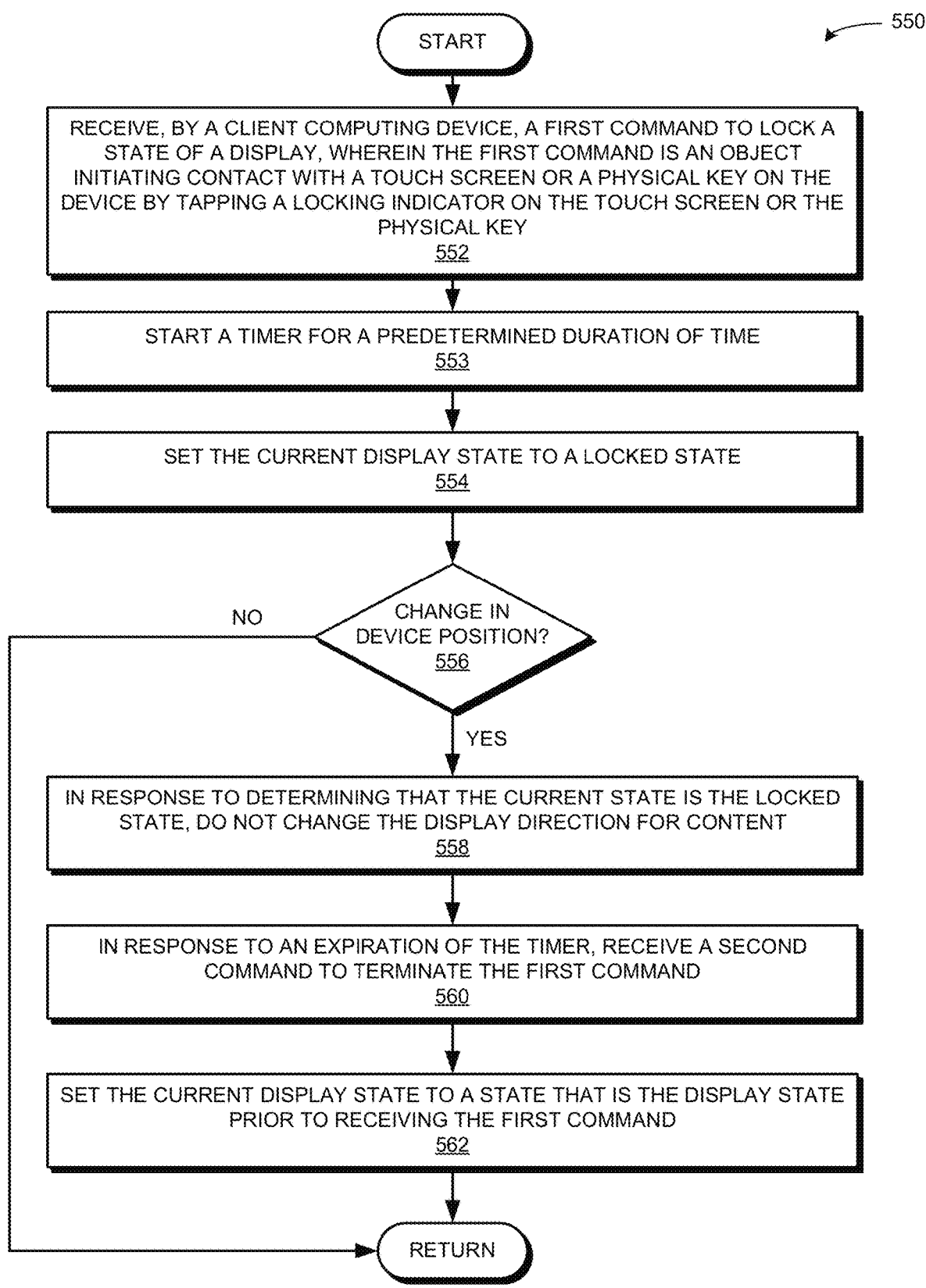
FIG. 5B presents a flowchart illustrating a method by a client computing device for controlling the display direction of content on the device, where an object taps the touch screen or a physical key and a timer starts, in accordance with an embodiment of the present application.

FIG. 5B presents a flowchart 550 illustrating a method by a client computing device for controlling the display direction of content on the device, where an object taps the touch screen or a physical key and a timer starts, in accordance with an embodiment of the present application. Flowchart 550 has a similar structure as flowchart 200 of FIG. 2, but is slightly modified to demonstrate the exemplary method for controlling the display direction. During operation, the system receives, by a client computing device, a first command to lock a state of a display for the device, where the first command is an object initiating contact with a touch screen or a physical key on the device by tapping a locking indicator on the touch screen or the physical key (operation 552). The locking indicator can be a region of the screen or a specific icon on the screen. In some embodiments, the tapping action can be replaced with another instant action, such as a voice command or another physical action performed on the device. The system starts a timer for a predetermined period of time (operation 553). The system may use a default period of time set by the device or a manually configured period of time set by the user. The system sets the current display state to a locked state (operation 554). Note that if the current display state is a locked state, the system can set the current display state to an unlocked state (not shown). The system determines whether it detects a change in the position of the device (decision 556). For example, the system can detect a change from a horizontal to a vertical device position or from a vertical to a horizontal device position. If the system does not detect a change in device position, the operation returns. If the system does detect a change in device position, in response to determining that the current display state is the locked state, the system does not change the display direction for the content (operation 558). The system refrains from changing the display direction. Note that if the current display state is an unlocked state, the system changes the display direction for the content (as shown by operation 216), e.g., from a vertical to a horizontal display direction, or from a horizontal to a vertical display direction. Subsequently, in response to an expiration of the timer, the system receives a second command to terminate the first command (operation 560). The system sets the current display state to the state that is the display state prior to receiving the first command (operation 562).

Figure 6:
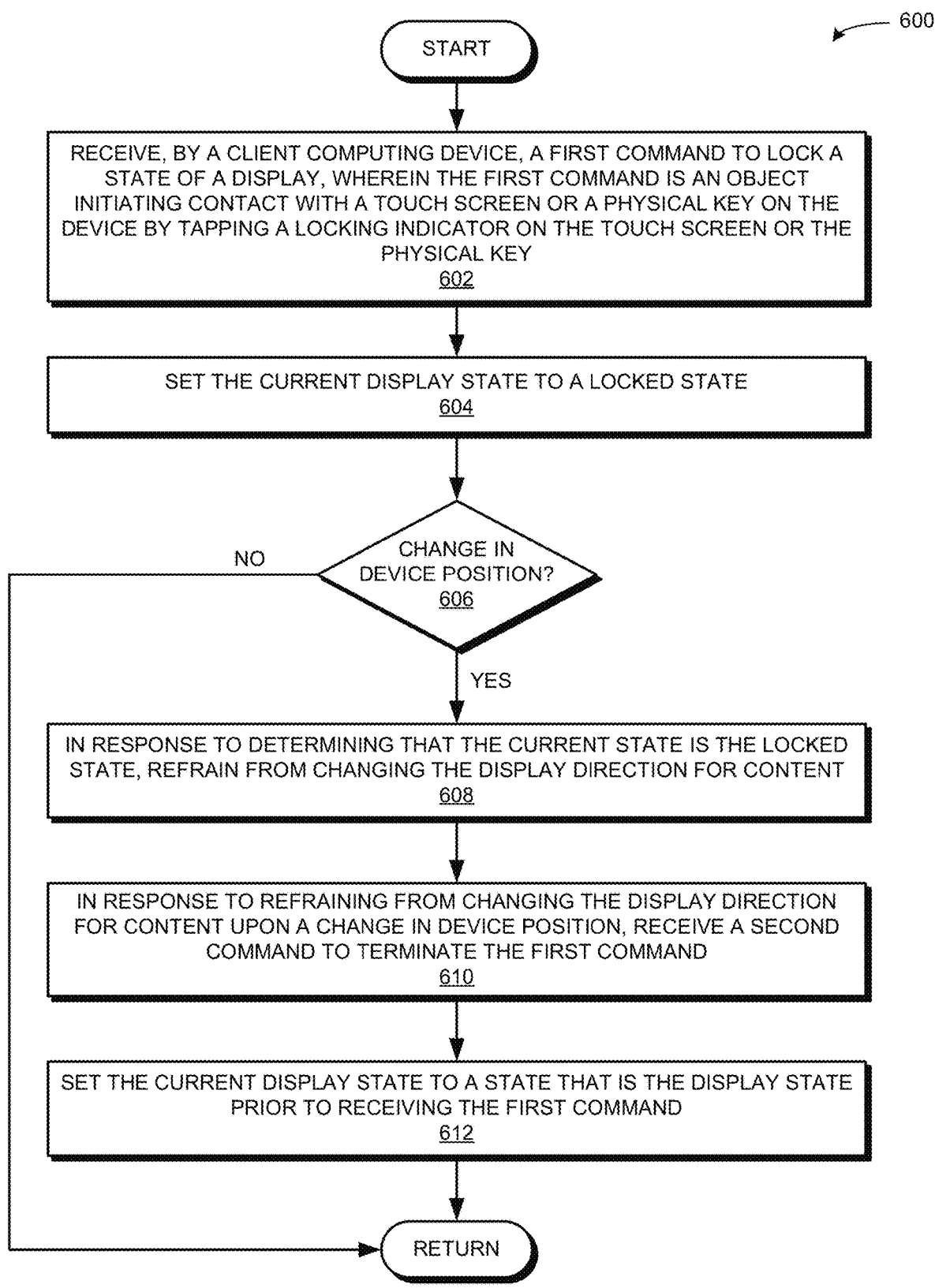
FIG. 6 presents a flowchart illustrating a method by a client computing device for controlling the display direction of content on the device, where an object taps the touch screen or a physical key, in accordance with an embodiment of the present application.

FIG. 6 presents a flowchart 600 illustrating a method by a client computing device for controlling the display direction of content on the device, where an object taps the touch screen or a physical key, in accordance with an embodiment of the present application. Flowchart 600 has a similar structure as flowchart 200 of FIG. 2, but is slightly modified to demonstrate the exemplary method for controlling the display direction. During operation, the system receives, by a client computing device, a first command to lock a state of a display for the device, where the first command is an object initiating contact with a touch screen or a physical key on the device by tapping a locking indicator on the touch screen or the physical key (operation 602). The system sets the current display state to a locked state (operation 604). The system determines whether it detects a change in the position of the device (decision 606). If the system does not detect a change in device position, the operation returns. If the system does detect a change in device position, in response to determining that the current display state is the locked state, the system refrains from changing the display direction for content (operation 608). In response to refraining from changing the display direction for content upon a change in device position, the system receives a second command to terminate the first command (operation 610). The system sets the current display state to the state that is the display state prior to receiving the first command (operation 612).

Exemplary Apparatus and Computer System

Figure 7:
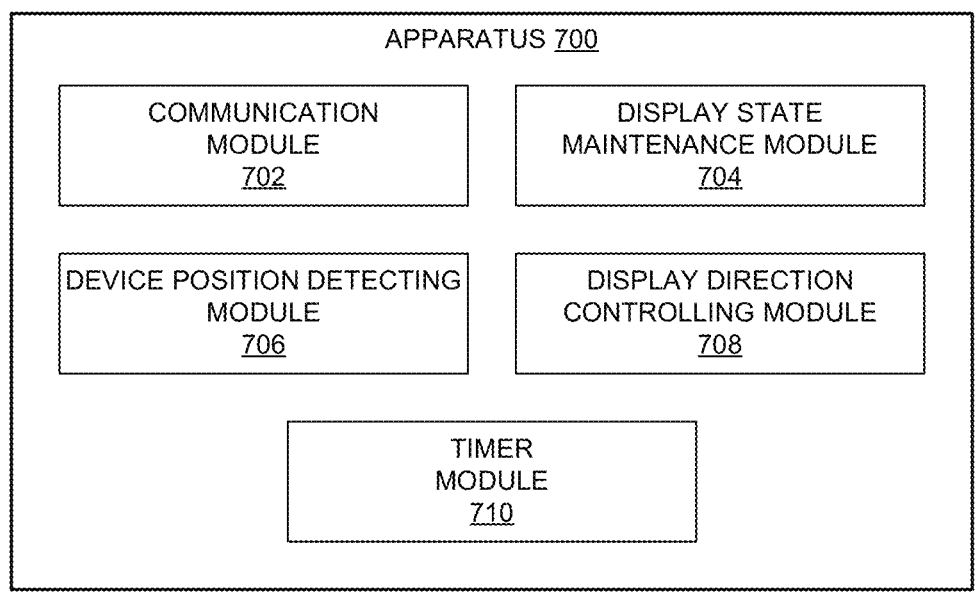
FIG. 7 illustrates an exemplary apparatus that facilitates control of the display direction of content on a device, in accordance with an embodiment of the present application.

FIG. 7 illustrates an exemplary apparatus 700 that facilitates control of the display direction of content on a device, in accordance with an embodiment of the present application. Apparatus 700 can comprise a plurality of modules which may communicate with one another via a wired or wireless communication channel. Apparatus 700 may be realized using one or more integrated circuits, and may include fewer or more modules than those shown in FIG. 7. Further, apparatus 700 may be integrated in a computer system, or realized as a separate device which is capable of communicating with other computer systems and/or devices. Specifically, apparatus 700 can comprise a communication module 702, a display state maintenance module 704, a device position detecting module 706, display direction controlling module 708, and a timer module 710.

In some embodiments, communication module 702 can send and/or receive data packets to/from other network nodes across a computer network, or as part of a communication between a user and his corresponding computing device, where a data packet can correspond to a first command to lock a state of a display for a device or a second command to terminate the first command. Display state maintenance module 704 can set a current display state to a locked state. In response to receiving the second command, display state maintenance module 704 can set the current display state to a state that is the display state prior to receiving the first command. Device position detecting module 706 can detect a change in a position of the device. In response to determining that the current display state is an unlocked state (display state maintenance module 704), display direction controlling module 708 can change a display direction for content displayed on the device. In response to determining that the current display state is a locked state (display state maintenance module 704), display direction controlling module 708 can refrain from changing the display direction for content displayed on the device.

In response to receiving a first command (communication module 702), timer module 710 can start a timer for a predetermined duration of time. In response to the expiration of the timer (timer module 710), communication module 710 can receive the second command to terminate the first command. In response to refraining from changing the display direction (display direction controlling module 708), communication module 710 can receive the second command to terminate the first command. Device position detecting module 706 can detect a change from the horizontal position to the vertical position or from the vertical position to the horizontal position. Display direction controlling module 708 can change the display direction from the horizontal display direction to the vertical display direction or from the vertical display direction to the horizontal display direction.

Figure 8:
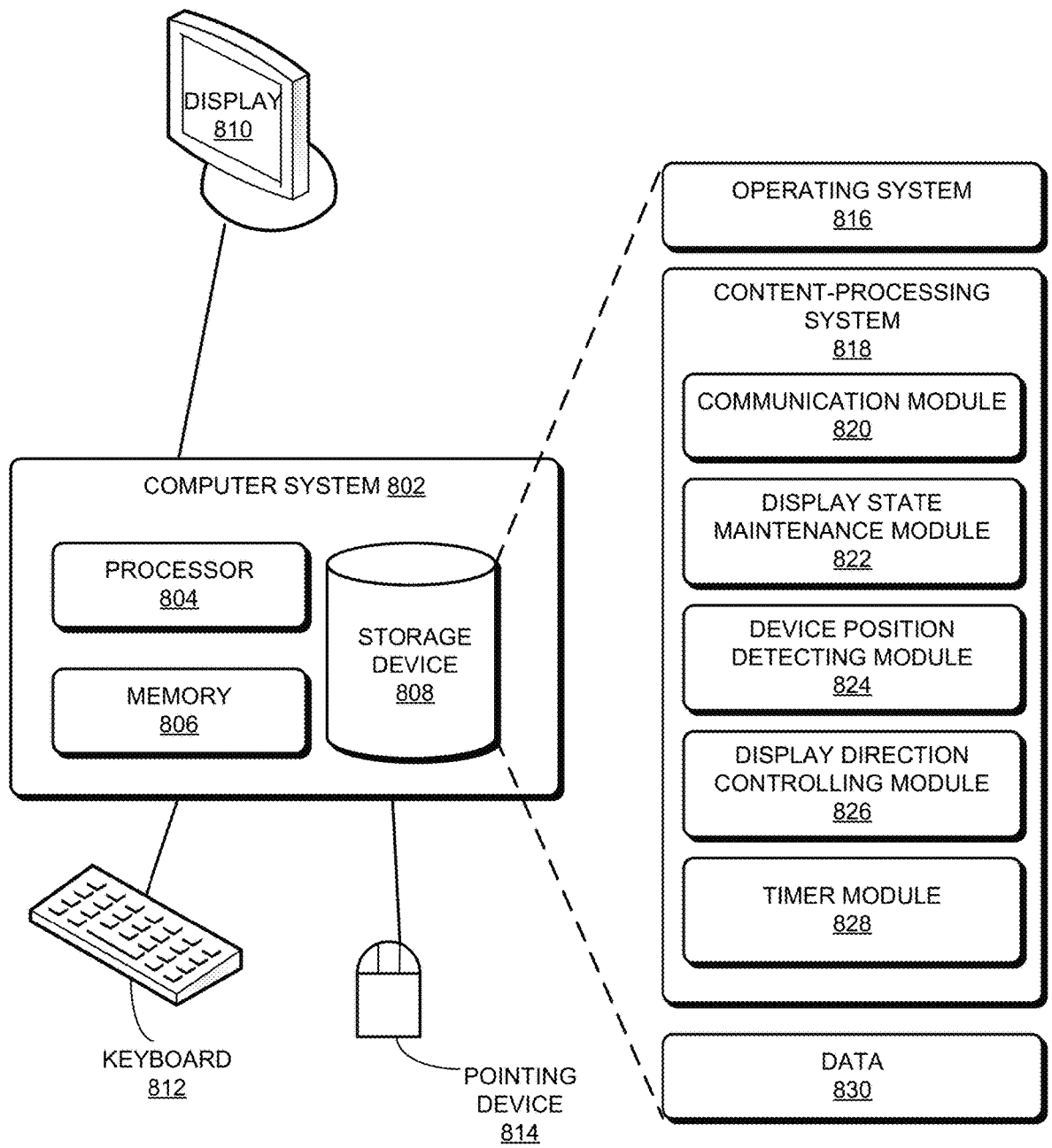
FIG. 8 illustrates an exemplary computer system that facilitates control of the display direction of content on a device, in accordance with an embodiment of the present application.

FIG. 8 illustrates an exemplary computer system 802 that facilitates control of the display direction of content on a device, in accordance with an embodiment of the present application. Computer system 802 includes a processor 804, a memory 806, and a storage device 808. Memory 806 can include a volatile memory (e.g., RAM) that serves as a managed memory, and can be used to store one or more memory pools. Furthermore, computer system 802 can be coupled to a display device 810, a keyboard 812, and a pointing device 814. Storage device 808 can store an operating system 816, a content-processing system 818, and data 830.

Content-processing system 818 can include instructions, which when executed by computer system 802, can cause computer system 802 to perform methods and/or processes described in this disclosure. Specifically, content-processing system 818 may include instructions for sending and/or receiving data packets to/from other network nodes across a computer network, or as part of a communication between a user and his corresponding computing device, where a data packet can correspond to a first command to lock a state of a display for a device or a second command to terminate the first command. Content-processing system 818 can include instructions for setting a current display state to a locked state (display state maintenance module 822). Content-processing system 818 can also include instructions for, in response to receiving the second command, setting the current display state to a state that is the display state prior to receiving the first command (display state maintenance module 822).

Content-processing system 818 can further include instructions for detecting a change in a position of the device (device position detecting module 824). Content-processing system 818 can include instructions for, in response to determining that the current display state is an unlocked state (display state maintenance module 822), changing a display direction for content displayed on the device (display direction controlling module 826). Content-processing system 818 can also include instructions for, in response to determining that the current display state is a locked state (display state maintenance module 822), refraining from changing the display direction for content displayed on the device (display direction controlling module 826).

Content-processing system 818 can additionally include instructions for, in response to receiving a first command (communication module 820), starting a timer for a predetermined duration of time (timer module 828). Content-processing system 818 can include instructions for, in response to the expiration of the timer (timer module 828), receiving the second command to terminate the first command (communication module 820). Content-processing system 818 can also include instructions for, in response to refraining from changing the display direction (display direction controlling module 826), receiving the second command to terminate the first command (communication module 820).

Content-processing system 818 can also include instructions for detecting a change from the horizontal position to the vertical position or from the vertical position to the horizontal position (device position detecting module 824). Content-processing system 818 can also include instructions for changing the display direction from the horizontal display direction to the vertical display direction or from the vertical display direction to the horizontal display direction (display direction controlling module 826)

Data 830 can include any data that is required as input or that is generated as output by the methods and/or processes described in this disclosure. Specifically, data 830 can store at least: a state of a display; a first command to lock the display state; a locked display state; an unlocked display state; a command to terminate the first command; a device position; an indicator of a horizontal or a vertical device position; a display direction for content; an indicator of a horizontal or a vertical display direction; the first command comprising an object initiating contact with a touch screen by maintaining contact with the screen; the second command comprising the object terminating contact with the screen; an indicator of an area on the touch screen; a locking indicator or an icon that indicates a locking function; the first command comprising the object initiating contact with the touch screen by tapping the locking area on the touch screen; a timer; and a duration of time for the timer.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer system for controlling display direction of content on a device, the computer system comprising:
   a processor; and
   a memory coupled to the processor and storing instructions, which when executed by the processor cause the processor to perform a method, the method comprising:
      configuring, by a user of a client computing device, an expiration determining, by the client computing device, a current display state for the device;
      detecting an object initiating a first contact with touch screen of the device at a single location on the touch screen, wherein the touch screen comprises an entire display area of the device;

starting a timer for the user-configured expiration time;

in response to determining that the current display state is a locked setting the current display state to an unlocked state;

allowing a display direction for content displayed on the device to change upon detecting a change in a position of the device prior to detecting an expiration of the timer; and in response to detecting the expiration of the timer:
refraining from changing the display direction for the content displayed on the device upon detecting device position changes; and
setting the current display state to the locked state; and in response to determining that the current display state is the unlocked state:
setting the current display state to the locked state;
refraining from changing the display direction for the content displayed on the device upon detecting device position changes prior to detecting the expiration of the timer; and
in response to detecting the expiration of the timer:
allowing the display direction to change with device position changes; and
setting the current display state to the unlocked state.

2. The computer system of claim 1, wherein the method further comprises:

detecting, by the client computing device, an object initiating and maintaining a second contact with a touch screen;

in response to determining that the current display state is the locked state:
setting the current display state to the unlocked state while the object maintains the second contact;
allowing the display direction to change with device position changes while the object maintains the second contact; and
in response to the second contact being terminated:
refraining from changing the display direction for the content displayed on the device upon detecting device position changes; and
setting the current display state to the locked state; and in response to determining that the current display state is the unlocked state:
setting the current display state to the locked state while the object maintains the second contact;
refraining from changing the display direction for the content displayed on the device upon detecting device position changes while the object maintains the second contact; and
in response to the second contact being terminated:
allowing the display direction to change with device position changes; and
setting the current display state to the unlocked state.

3. The computer system of claim 2, wherein the object initiating the first contact or the second contact comprises one or more of:
one or more fingers of a user of the device; and
any object comprised of a material recognizable by the touch screen.

4. The computer system of claim 2, wherein the first contact or the second contact is detected with an area of the touch screen which comprises a locking indicator or an icon that indicates a locking function.

5. The computer system of claim 2, further comprising:
in response to determining that the current display state is an unlocked state, changing the display direction for content displayed on the device upon detecting a change in the position of the device.

6. The computer system of claim 2, wherein the expiration time is a default period of time set by the device or a manually configured period of time set by the user.

7. The computer system of claim 1, wherein the device has a length not equal to a width, and wherein a vertical position of the device corresponds to a shorter side placed parallel to the ground and a horizontal position of the device corresponds to a longer side placed parallel to the ground.

8. The computer system of claim 7, wherein detecting a change in the position of the device further comprises:
detecting a change from the horizontal position to the vertical position or from the vertical position to the horizontal position.

9. The computer system of claim 1, wherein the device has a length not equal to a width, wherein a vertical display direction for the content corresponds to content displayed from a top to a bottom of the device along a longer side with a shorter side placed parallel to the ground, and wherein a horizontal display direction for the content corresponds to content displayed from the top to the bottom of the device along the shorter side with the longer side placed parallel to the ground.

10. The computer system of claim 9, wherein changing a display direction for content displayed on the device further comprises:
changing the display direction from the horizontal display direction to the vertical display direction or from the vertical display direction to the horizontal display direction.

11. The computer system of claim 9, wherein a vertical position of the device corresponds to a shorter side placed parallel to the ground and a horizontal position of the device corresponds to a longer side placed parallel to the ground, and
wherein when the device is in the horizontal device position and the horizontal display direction, the display includes a portion of the screen which is visible only when the device is in the horizontal device position, and which is not visible when the device is in the vertical device position.

12. The computer system of claim 9, wherein a vertical position of the device corresponds to a shorter side placed parallel to the ground and a horizontal position of the device corresponds to a longer side placed parallel to the ground, and
wherein when the device is in the horizontal device position and the horizontal display direction, the display includes a portion of the screen which is cut off as compared to when the device is in the vertical device position and the vertical display direction.

13. The computer system of claim 1, wherein the method further comprises:
receiving, by the client computing device, a voice command;
wherein starting the timer for the user-configured expiration time is in response to receiving the voice command.

14. A computer-implemented method for controlling display direction of content on a device, the method comprising:

configuring, by a user of a client computing device, an expiration determining, by the client computing device, a current display state for the device;

detecting an object initiating a first contact with touch screen of the device at a single location on the touch screen, wherein the touch screen comprises an entire display area of the device;

starting a timer for the user-configured expiration time;

in response to determining that the current display state is a locked setting the current display state to an unlocked state;

allowing a display direction for content displayed on the device to change upon detecting a change in a position of the device prior to detecting an expiration of the timer; and in response to detecting the expiration of the timer:

refraining from changing the display direction for the content displayed on the device upon detecting device position changes; and setting the current display state to the locked state; and in response to determining that the current display state is the unlocked state:

setting the current display state to the locked state;

refraining from changing the display direction for the content displayed on the device upon detecting device position changes prior to detecting the expiration of the timer; and in response to detecting the expiration of the timer:

allowing the display direction to change with device position changes; and setting the current display state to the unlocked state.

15. The method of claim 14, wherein the method further comprises:

detecting, by the client computing device, an object initiating and maintaining a second contact with a touch screen;

in response to determining that the current display state is the locked state:

setting the current display state to the unlocked state while the object maintains the second contact;

allowing the display direction to change with device position changes while the object maintains the second contact; and in response to the second contact being terminated:

refraining from changing the display direction for the content displayed on the device upon detecting device position changes; and setting the current display state to the locked state; and in response to determining that the current display state is the unlocked state:

setting the current display state to the locked state while the object maintains the second contact;

refraining from changing the display direction for the content displayed on the device upon detecting device position changes while the object maintains the second contact; and in response to the second contact being terminated:

allowing the display direction to change with device position changes; and setting the current display state to the unlocked state.

16. The method of claim 15, wherein the object initiating the first contact or the second contact comprises one or more of:

one or more fingers of a user of the device; and any object comprised of a material recognizable by the touch screen.

17. The method of claim 15, wherein the first contact or the second contact is detected with an area of the touch screen which comprises a locking indicator or an icon that indicates a locking function.

18. The method of claim 15, further comprising:

in response to determining that the current display state is an unlocked state, changing the display direction for content displayed on the device upon detecting a change in the position of the device.

19. The method of claim 14, wherein the device has a length not equal to a width, and wherein a vertical position of the device corresponds to a shorter side placed parallel to the ground and a horizontal position of the device corresponds to a longer side placed parallel to the ground.

20. The method of claim 19, wherein detecting a change in the position of the device further comprises:

detecting a change from the horizontal position to the vertical position or from the vertical position to the horizontal position.

21. The method of claim 14, wherein the device has a length not equal to a width, wherein a vertical display direction for the content corresponds to content displayed from a top to a bottom of the device along a longer side with a shorter side placed parallel to the ground, and wherein a horizontal display direction for the content corresponds to content displayed from the top to the bottom of the device along the shorter side with the longer side placed parallel to the ground.

22. The method of claim 21, wherein changing a display direction for content displayed on the device further comprises:

changing the display direction from the horizontal display direction to the vertical display direction or from the vertical display direction to the horizontal display direction.

* * * * *

UNITED STATES PATENT AND TRADEMARK OFFICE
CERTIFICATE OF CORRECTION

PATENT NO.         : 10,482,578 B2
APPLICATION NO.    : 14/928116
DATED              : November 19, 2019
INVENTOR(S)        : Yaran Lu Page 1 of 1

It is certified that error appears in the above-identified patent and that said Letters Patent is hereby corrected as shown below:

In the Claims

Claim 1, Column 10, Line 64 should read: "expiration time; determining, by the client computing"

Signed and Sealed this
Second Day of February, 2021

Drew Hirshfeld
*Performing the Functions and Duties of the*
*Under Secretary of Commerce for Intellectual Property and*
*Director of the United States Patent and Trademark Office*